(12) United States Patent
Hiramoto et al.

(10) Patent No.: US 10,174,774 B2
(45) Date of Patent: Jan. 8, 2019

(54) IN-TANK VALVE

(71) Applicants: KEIHIN CORPORATION, Tokyo (JP); HONDA MOTOR CO., LTD., Tokyo (JP)

(72) Inventors: Hideto Hiramoto, Sakura (JP); Hiroyasu Ozaki, Utsunomiya (JP); Koichi Takaku, Tochigi-ken (JP)

(73) Assignees: KEIHIN CORPORATION, Tokyo (JP); HONDA MOTOR CO., LTD., Tokyo (JP)

( * ) Notice: Subject to any disclaimer, the term of this patent is extended or adjusted under 35 U.S.C. 154(b) by 5 days.

(21) Appl. No.: 15/079,792

(22) Filed: Mar. 24, 2016

(65) Prior Publication Data

US 2016/0281867 A1    Sep. 29, 2016

(30) Foreign Application Priority Data

Mar. 27, 2015   (JP) .................. 2015-066458

(51) Int. Cl.
*F16B 2/20* (2006.01)
*F17C 13/04* (2006.01)

(52) U.S. Cl.
CPC ............... *F16B 2/20* (2013.01); *F17C 13/04* (2013.01); *F17C 2205/0323* (2013.01);
(Continued)

(58) Field of Classification Search
CPC .. F16B 2/20; F16B 2/241; F17C 13/04; F17C 2205/0323; F17C 2205/0391; F17C 2270/0184; F17C 2221/012; F17C 2223/036; F17C 2250/0439; F17C 2250/0491; F17C 2270/0168;
(Continued)

(56) References Cited

U.S. PATENT DOCUMENTS 3,438,664 A * 4/1969 Meyer ............... F16B 2/241
                                                249/219.1
4,463,538 A * 8/1984 Dragunas ............ E04C 5/0604
                                                52/677
(Continued)

FOREIGN PATENT DOCUMENTS

| JP | 2009-144831 | 7/2009 |
| JP | 2012-097815 | 5/2012 |
| JP | 5217625 | 3/2013 |

OTHER PUBLICATIONS

This application is co-pending with U.S. Appl. No. 15/079,778, which was filed in the United States Patent and Trademark Office on Mar. 24, 2016.
(Continued)

*Primary Examiner* — Craig J Price
*Assistant Examiner* — Andrew J Rost
(74) *Attorney, Agent, or Firm* — Rankin, Hill & Clark LLP

(57) ABSTRACT

In a detector that constitutes an in-tank valve, an attachment part formed on one end thereof is arranged in facing relation to a connector of a drive unit, and arm members of a bracket, which is substantially U-shaped in cross section and is fixed to the connector, are inserted in and engaged with engagement holes of the attachment part. Thus, the detector is always retained firmly in a state of being pulled to the side of the drive unit by elastic forces of the bracket.

2 Claims, 4 Drawing Sheets

(52) U.S. Cl.
CPC .......................... *F17C 2205/0391* (2013.01); *F17C 2221/012* (2013.01); *F17C 2223/0123* (2013.01); *F17C 2223/036* (2013.01); *F17C 2250/0439* (2013.01); *F17C 2250/0491* (2013.01); *F17C 2270/0168* (2013.01); *F17C 2270/0184* (2013.01); *Y02E 60/321* (2013.01)

(58) Field of Classification Search
CPC ........... F17C 2223/0123; F17C 13/026; Y02E 60/321; F16K 15/00; F16K 31/02
USPC .................. 73/756, 866.5; 285/319; 251/356
See application file for complete search history.

(56) References Cited

U.S. PATENT DOCUMENTS

| | | | | |
|---|---|---|---|---|
| 5,253,949 | A * | 10/1993 | Oxley | B62D 1/16 403/155 |
| 5,647,389 | A * | 7/1997 | Holloway | F16K 31/602 137/15.18 |
| 6,227,785 | B1 * | 5/2001 | Kilgore | F16B 2/241 411/437 |
| 7,645,107 | B2 * | 1/2010 | Yoneoka | F16B 37/0857 411/433 |
| 8,052,119 | B2 * | 11/2011 | Numazaki | F16K 1/36 251/282 |
| 2008/0302336 | A1 * | 12/2008 | Fuerst | F02M 55/025 123/470 |
| 2009/0288723 | A1 | 11/2009 | Numazaki et al. | |
| 2010/0132168 | A1 * | 6/2010 | Coffland | F16B 2/241 24/517 |
| 2013/0220276 | A1 * | 8/2013 | Nakamura | F02M 69/04 123/470 |
| 2014/0174574 | A1 | 6/2014 | Lhymn et al. | |

OTHER PUBLICATIONS

U.S. Office Action from co-pending U.S. Appl. No. 15/097,778 dated Jun. 14, 2018, 22 pages.

* cited by examiner

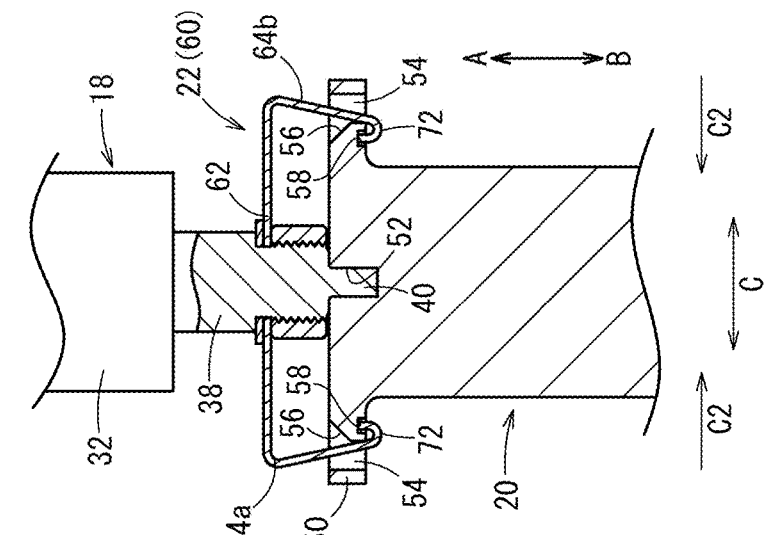
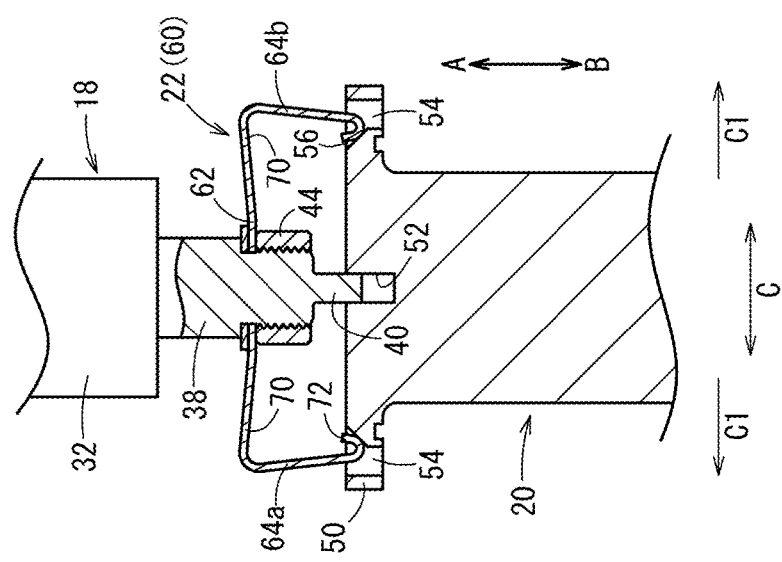
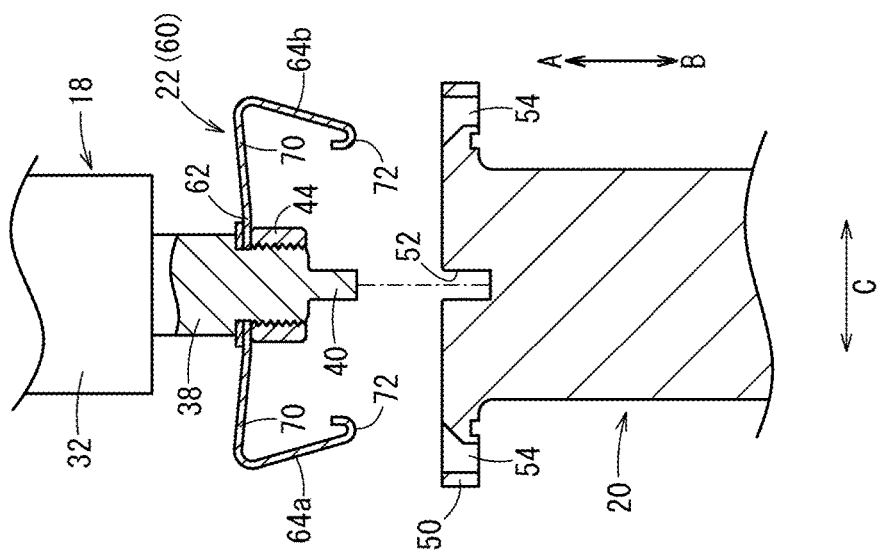

IN-TANK VALVE

CROSS-REFERENCE TO RELATED APPLICATION

This application is based upon and claims the benefit of priority from Japanese Patent Application No. 2015-066458 filed on Mar. 27, 2015, the contents of which are incorporated herein by reference.

BACKGROUND OF THE INVENTION

Field of the Invention

The present invention relates to an in-tank valve disposed in the interior of a tank for switching between filling of a high pressure gas into the tank and discharging the high pressure gas to the exterior.

Description of the Related Art

Heretofore, an in-tank valve for the purpose of switching between filling and discharging of a gas has been provided in a gas tank into which a gas is filled. For example, in the in-tank valve disclosed in Japanese Patent No. 5217625, a temperature sensor, which is capable of detecting the temperature of a hydrogen gas in the interior of the tank, is disposed on a distal end of a body that is inserted in an inner part of the tank. In addition, when hydrogen gas is filled in the tank or when hydrogen gas is discharged from the tank, a temperature change is detected by the temperature sensor.

SUMMARY OF THE INVENTION

In the case that a temperature sensor is disposed on the distal end of the body as in the aforementioned in-tank valve, since an influence is received from the hydrogen that flows in the interior of the tank, a rigid attachment structure is desirable that firmly attaches the temperature sensor, so that rattling or falling off, etc., of the temperature sensor does not occur. However, if a rigid attachment structure is adopted, manufacturing costs are increased and ease of assembly is deteriorated.

A general object of the present invention is to provide an in-tank valve, which with a simple structure, is capable of easily and firmly attaching a detector with respect to a body.

The present invention is characterized by an in-tank valve disposed in a tank in which a high pressure gas is stored in interior thereof, comprising a body including a valve configured to open and close a flow path, and a detector configured to detect a temperature of the high pressure gas, wherein a retaining unit configured to retain the detector with respect to the body is disposed between the body and the detector, and the retaining unit imparts a resilient force in directions to cause the body and the detector to approach one another mutually.

According to the present invention, the retaining unit that retains the detector with respect to the body is disposed between the detector and the body that constitutes the in-tank valve, and by the resilient force being imparted in directions to cause the body and the detector to approach one another mutually, the body and the detector are always retained firmly in a state of being pulled mutually toward each other.

Consequently, with a simple structure in which the retaining unit is disposed between the body and the detector, the detector can easily be fixed with respect to the body, while in addition, the detector can be attached firmly without the occurrence of falling off or rattling thereof.

The above and other objects, features, and advantages of the present invention will become more apparent from the following description when taken in conjunction with the accompanying drawings, in which a preferred embodiment of the present invention is shown by way of illustrative example.

BRIEF DESCRIPTION OF THE DRAWINGS

FIG. 4A is an explanatory drawing of a condition prior to assembly of the detector with respect to the drive unit;

FIG. 4B is an explanatory drawing of a condition during assembly of the drive unit of FIG. 4A as the drive unit is brought into proximity with the detector; and FIG. 4C is an explanatory drawing showing a condition in which the detector of FIG. 4B is assembled with respect to the drive unit.

DESCRIPTION OF THE PREFERRED EMBODIMENTS

Figure 1:
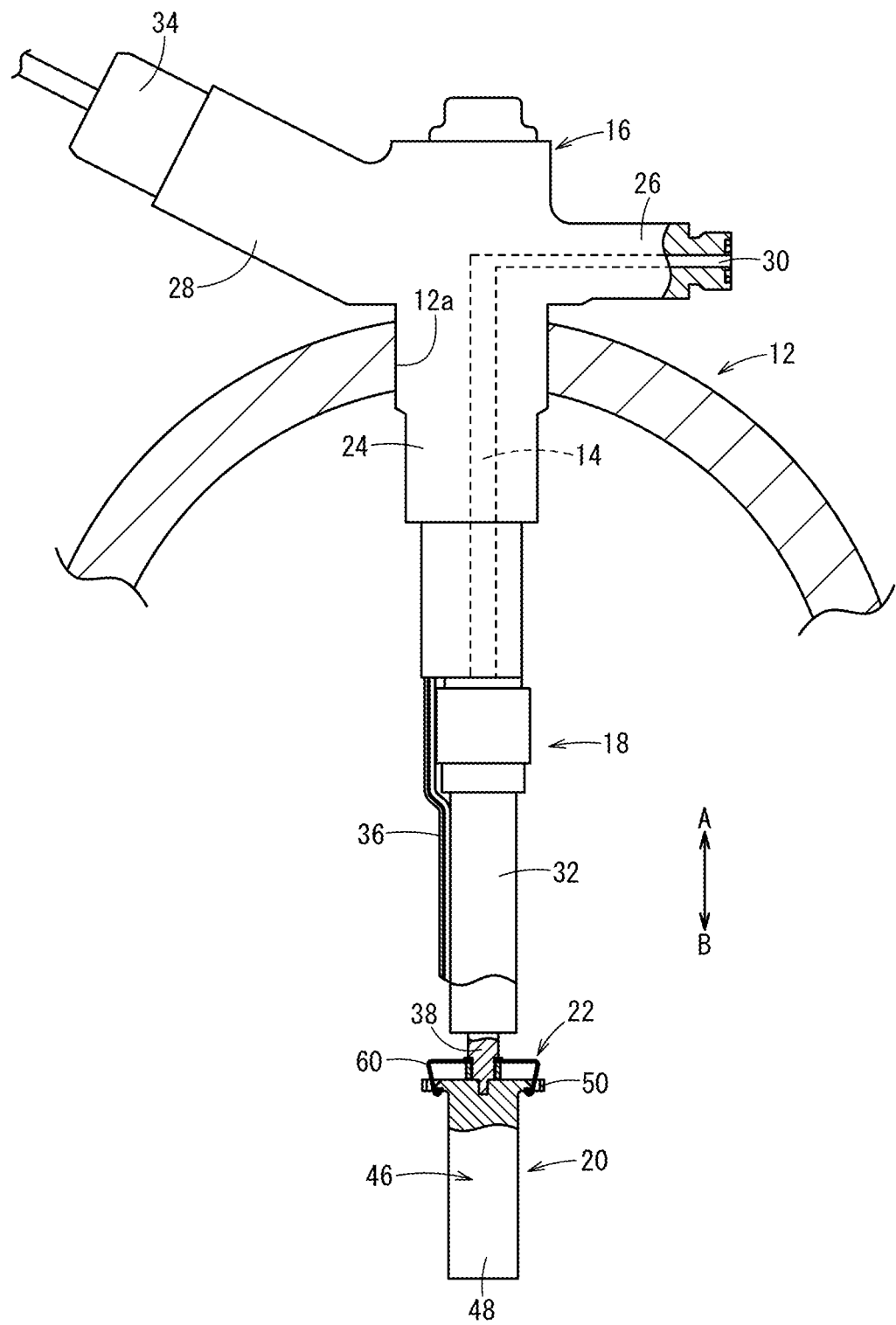
FIG. 1 is a structural diagram partially in cross section showing an in-tank valve according to an embodiment of the present invention, and a portion of a tank in which the in-tank valve is installed.

A preferred embodiment of an in-tank valve according to the present invention will be described in detail below with reference to the accompanying drawings. In FIG. 1, reference numeral 10 indicates an in-tank valve according to an embodiment of the present invention.

The in-tank valve 10 is used, for example, in a fuel cell system of a fuel cell vehicle, and is used with the aim of filling hydrogen gas as a high pressure gas into a tank 12, or of supplying (discharging) the hydrogen gas to the fuel cell system from the tank 12. Only the vicinity of an opening 12a of the tank 12 is illustrated in FIG. 1.

As shown in FIG. 1, the in-tank valve 10 includes a body 16, which is disposed in the opening 12a that is formed in one end portion of the tank 12, the body 16 having a flow path 14 therein through which hydrogen gas flows into the interior of the tank 12, a drive unit (body) 18 connected to an end of the body 16, a detector 20 that detects a state of the hydrogen gas in the interior of the tank 12, and a retaining unit 22 that retains the detector 20 with respect to the drive unit 18. The tank 12 is made up from a cylindrical body, both ends of which are formed in a substantially hemispherical shape.

The body 16 is formed, for example, from a metal material, and includes a main body portion 24, which is formed in a straight line shape along an axial direction (the directions of arrows A and B) and is mounted in the opening 12a of the tank 12, a piping connector 26 that projects out sideways with respect to the main body portion 24, and a power source connector 28 that projects out in an opposite direction to the piping connector 26.

In a state in which the one end thereof projects on an outer side of the tank 12, a substantially central part of the main body portion 24 is fixed by being inserted into the opening 12a of the tank 12. On the other hand, the other end side of the main body portion 24 is accommodated in the interior of the tank 12.

The flow path 14 that extends in the axial direction (the directions of arrows A and B) is formed in the interior of the main body portion 24. One end of the flow path 14 is connected to a connecting flow path 30 that is formed in the piping connector 26, and the other end of the flow path 14 communicates with a housing 32 of the drive unit 18. A non-illustrated hydrogen gas supplying device or a fuel cell system, for example, is connected selectively through piping to the piping connector 26.

A coupler 34 connected to a non-illustrated control device, for example, is disposed detachably to the power source connector 28. Lead wires for supplying electric current to, i.e., energizing, a solenoid unit (not shown) that constitutes the drive unit 18, and lead wires (wiring) 36 for outputting a detection signal detected by the detector 20, are incorporated in the power source connector 28. In addition, by connecting the coupler 34 with respect to the power source connector 28, a control signal from the non-illustrated control device is transmitted to the drive unit 18, whereas the detection signal detected by the detector 20 is output to the control device.

The drive unit 18 includes in the interior of the cylindrical housing 32 the solenoid unit (not shown) which becomes excited upon being energized, and a communication state of the flow path 14 is switched by opening and closing of a valve body under an exciting action of the solenoid unit. As shown in FIGS. 1 through 2B, in the center of the other end of the housing 32, a connector 38 is formed that projects out in the axial direction (the direction of the arrow B). A locating pin 40, which is reduced in diameter and projects in the axial direction (the direction of the arrow B), is provided in the center in the other end of the connector 38.

Further, a reduced diameter stepped portion 42 is included on the other end of the connector 38, and the retaining unit 22, which is inserted over an outer circumferential side of the connector 38, is fixed by a fastening nut 44 to the stepped portion 42.

The detector 20, for example, includes a sensor casing 46 that is connected to another end of the drive unit 18, and a sensor (not shown), which is capable of detecting the temperature of the hydrogen gas in the interior of the tank 12, is accommodated in the interior of the sensor casing 46.

The sensor casing 46 includes a tubular part 48 that is opened on another end part thereof on the side of the tank 12 (in the direction of the arrow B), and an attachment part 50 that is formed on one end of the tubular part 48 and is connected to the drive unit 18. In addition, the temperature of the hydrogen gas is detected by a sensor that is accommodated in the interior of the tubular part 48, and is output as an electrical signal to the control device through the lead wires 36.

Figure 2A:
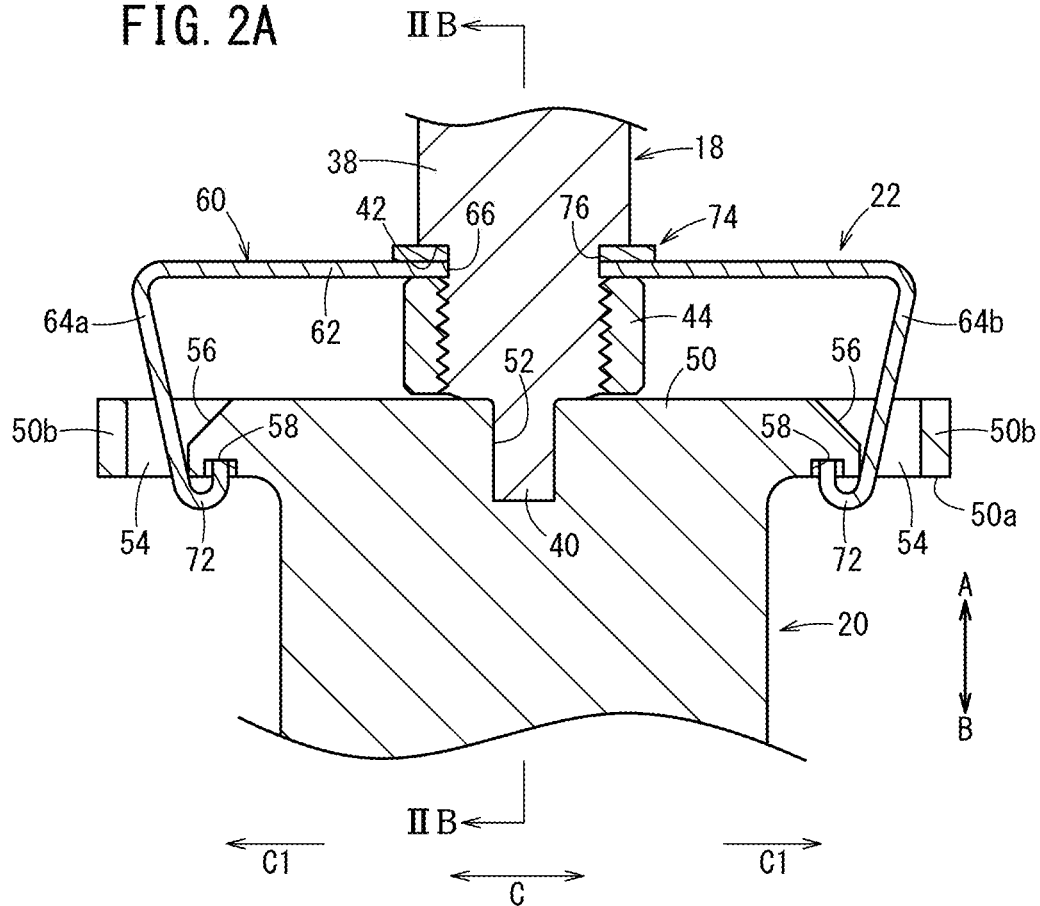
FIG. 2A is an enlarged cross-sectional view showing the vicinity of a connection site between a drive unit and a detector in the in-tank valve of FIG. 1.
Figure 2B:
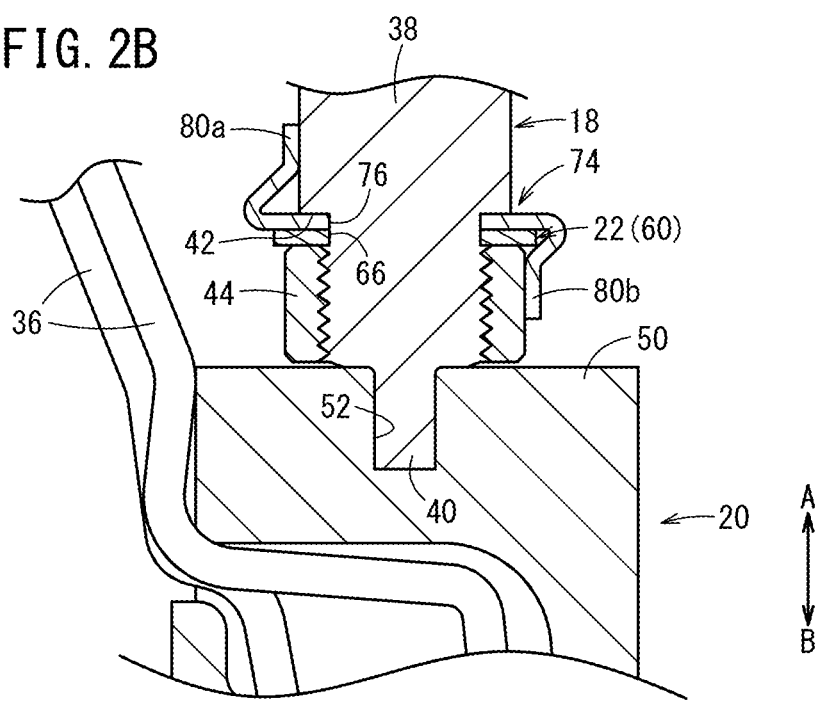
FIG. 2B is a cross-sectional view taken along line IIB-IIB of FIG. 2A.

As shown in FIG. 2A, for example, the attachment part 50 is formed with a rectangular shape in cross section extending in a direction (the directions of the arrow C) perpendicular to the axial direction of the tubular part 48, and a locating hole 52 into which the locating pin 40 of the drive unit 18 is inserted is formed substantially in the center thereof. Together therewith, on both ends in the lateral direction (the directions of the arrow C) thereof, a pair of engagement holes (engagement members) 54 are formed respectively that penetrate through the thickness direction (the directions of arrows A and B).

Inner wall surfaces 56 of the engagement holes 54 on central sides of the attachment part 50 are formed in tapered shapes, which are inclined gradually on both end sides (in the directions of the arrows C1) toward the other end side (in the direction of the arrow B) of the tubular part 48.

Further, on the attachment part 50, on an end surface 50a thereof that is joined to the tubular part 48, a pair of grooves 58 are formed at positions on the side of the tubular part 48 with respect to the engagement holes 54 in the widthwise direction (the directions of the arrow C). The grooves 58 are formed in straight lines in parallel with the engagement holes 54, and are formed at a predetermined depth with respect to the end surface 50a of the attachment part 50.

The retaining unit 22 is made up from a bracket 60 that is disposed between the one end of the detector 20 and the other end of the drive unit 18.

As shown in FIGS. 1 through 3B, the bracket 60 is formed, for example, by press forming a thin plate constituted from a metal material, and is made up from a substantially flat base member 62, and a pair of arm members 64a, 64b that extend while being bent at predetermined angles of inclination from both ends of the base member 62.

A hole 66 is formed substantially in the center of the base member 62, and the connector 38 of the drive unit 18 is inserted through the interior of the hole 66.

Further, the base member 62 includes inclined sections 70, which are inclined at a predetermined angle toward both ends thereof. The inclined sections 70 are inclined in a direction (the direction of the arrow A) away from the arm members 64a, 64b, and the ends thereof are joined respectively to the arm members 64a, 64b. The angle of inclination θ of the inclined sections 70, for example, is set on the order of 5° with respect to the base member 62 (see FIG. 3B).

The arm members 64a, 64b extend in straight line shapes in a direction away from the base member 62, and the one arm member 64a and the other arm member 64b are inclined so as to approach one another mutually. In addition, hooks 72, which are bent inwardly with a U-shape in cross section, are formed respectively on ends of the arm members 64a, 64b.

Further, by the bracket 60 being fixed by the fastening nut 44 in a state with the connector 38 of the drive unit 18 being inserted in the hole 66, the arm members 64a, 64b are fixed in a state of extending in a direction (the direction of the arrow B) away from the drive unit 18. In this case, the base member 62 is fixed in a state of extending in a direction (the direction of the arrow C) substantially perpendicular to the axis of the drive unit 18.

Further, as shown in FIGS. 2A and 2B, a rotation preventing member 74 is fixed together with the bracket 60 to the connector 38. As shown in FIGS. 2A through 3A, the rotation preventing member 74, similar to the bracket 60, is formed, for example, by press forming a thin plate constituted from a metal material, and is made up from a substantially flat base member 78 having a hole 76 in the center thereof, and a pair of wall portions 80a, 80b that are formed on the outer circumferential side of the hole 76 and are erected with respect to the base member 78.

The wall portions 80a, 80b are disposed such that the hole 76 is sandwiched respectively therebetween, and are formed substantially perpendicularly with respect to a side surface of the base member 78. Together therewith, one wall portion 80a and the other wall portion 80b project out in opposite directions, which are mutually different with respect to the base member 78 (see FIGS. 2B and 3A).

In addition, as shown in FIG. 2B, on the rotation preventing member 74, the base member 78 thereof is fixed to the connector 38 by the fastening nut 44 together with the base member 62 of the bracket 60. One wall portion 80a is plastically deformed substantially perpendicularly with respect to the base member 78 and is made to abut against (contact) a side surface of the connector 38, and similarly, the other wall portion 80b is plastically deformed substantially perpendicularly with respect to the base member 78 and is made to abut against a side surface of the fastening nut 44. Owing thereto, rotation of the bracket 60 with respect to the drive unit 18 is regulated through the rotation preventing member 74.

At this time, the wall portions 80a, 80b are arranged about the connector 38 and are shifted by roughly 90° with respect to the arm members 64a, 64b of the bracket 60, so as not to come into contact with the arm members 64a, 64b.

More specifically, the pair of wall portions 80a, 80b functions as a rotation preventing means to regulate rotational displacement of the bracket 60 with respect to the drive unit 18, and after the bracket 60 is assembled with respect to the connector 38 of the drive unit 18, the wall portions 80a, 80b are bent and placed in abutment with the connector 38.

Further, the bracket 60 is not limited to the case of being provided as a separate body with respect to the drive unit 18 as described above. For example, a structure may be provided in which the bracket 60 is formed integrally with the housing 32 of the drive unit 18 or the sensor casing 46 of the detector 20. In this manner, by the bracket 60 being formed integrally with the drive unit 18 or the detector 20, compared to the case of being provided separately, the number of parts can be reduced, while at the same time since ease of assembly can be enhanced, the number of assembly steps can also be reduced.

Furthermore, the above-described rotation preventing member 74 is not limited to the case of being provided separately from the bracket 60, and may be disposed in an integral manner with the bracket 60.

The in-tank valve 10 according to the embodiment of the present invention is constructed basically as described above. Next, with reference to FIGS. 4A through 4C, a case will be described in which the detector 20 is retained with respect to the drive unit 18.

Initially, as shown in FIG. 4A, the other end of the drive unit 18 is arranged above the detector 20, and in a state in which the locating pin 40 and the locating hole 52 are located on a straight line, the drive unit 18 is moved into proximity toward the side of the detector 20 (in the direction of the arrow B).

In addition, as shown in FIG. 4B, by starting insertion of the locating pin 40 of the drive unit 18 into the locating hole 52, the drive unit 18 and the detector 20 are positioned on the same axis, while simultaneously, the distal ends (hooks 72) of the arm members 64a, 64b on the bracket 60 begin to be inserted into the engagement holes 54 of the attachment part 50.

By bringing the drive unit 18 further into proximity to the side of the detector 20 (in the direction of the arrow B), the hooks 72 of the arm members 64a, 64b gradually are pressed expansively in outer widthwise directions (the directions of the arrows C1) while abutting against the inner wall surfaces 56 of the engagement holes 54, and when the other ends of the inner wall surfaces 56 are overcome, the hooks 72 are moved inwardly in the widthwise direction (the directions of the arrows C2) by the resilient forces thereof.

Owing thereto, as shown in FIG. 4C, the distal ends of the hooks 72 on the arm members 64a, 64b are inserted into the grooves 58 of the attachment part 50, and in a state in which the detector 20 is pulled toward the side of the drive unit 18 (in the direction of the arrow A) by the elastic forces of the inclined sections 70, the detector 20 is retained with respect to the connector 38 of the drive unit 18.

In the foregoing manner, the bracket 60 is fixed beforehand to the other end of the drive unit 18, the drive unit 18 and the detector 20 are brought mutually into proximity with each other, and the arm members 64a, 64b of the bracket 60 are inserted into the engagement holes 54 of the detector 20 and the hooks 72 are engaged in the grooves 58, whereby the attachment part 50 can be retained in a lifted condition by the arm members 64a, 64b due to the elastic forces possessed by the inclined sections 70 toward the side of the drive unit 18. Therefore, the detector 20 can easily be retained in the axial direction (the directions of arrows A and B) with respect to the drive unit 18, together with being retained firmly so that falling off or rattling thereof does not occur.

Further, by inserting the locating pin 40 of the drive unit 18 into the locating hole 52 of the detector 20, both members can easily and reliably be arranged coaxially, while in addition, since the arm members 64a, 64b assume positions corresponding to the engagement holes 54, there is no need to perform repositioning anew, and the arm members 64a, 64b can be inserted easily into the engagement holes 54.

Furthermore, in the attachment part 50, since outer walls 50b are included on outer sides (in the directions of the arrows C1) in the widthwise direction of the engagement holes 54, the arm members 64a, 64b are prevented from mistakenly becoming inclined and moving away in outer widthwise directions (the directions of the arrows C1) because the arm members 64a, 64b engaged in the engagement holes 54 will abut against the outer walls 50b.

Next, operations and effects of the in-tank valve 10, in which the detector 20 is connected or linked with respect to the other end of the drive unit 18, will be described.

At first, a description will be given concerning a case in which hydrogen gas from the non-illustrated hydrogen gas supplying device is filled in the tank 12. The hydrogen gas supplying device (not shown) is connected beforehand to the piping connector 26 of the body 16.

When hydrogen gas from the non-illustrated hydrogen gas supplying device is supplied to the connecting flow path 30 of the piping connector 26, a check valve (not shown) disposed in the connecting flow path 30 is opened automatically by the pressure of the hydrogen gas, thus resulting in a valve-open state. In addition, after the hydrogen gas has flowed from the connecting flow path 30 into the flow path 14, the hydrogen gas passes through the interior of the drive unit 18, whereupon the hydrogen gas is supplied into and fills the tank 12.

Next, a description will be made concerning supply of the hydrogen gas, which has been stored in the tank 12 in the foregoing manner, to a fuel cell system. In this case, the piping connector 26 is connected beforehand through non-illustrated piping to the fuel cell system.

At first, by transmission of a signal to the drive unit 18 from a non-illustrated control device, a valve body (not shown) is operated, and a state of communication is established between the flow path 14 and the interior of the tank 12.

In addition, after hydrogen gas inside the tank 12 has flowed into the interior of the housing 32 of the drive unit 18, the hydrogen gas is supplied to a fuel cell system (not shown) that is connected to the piping connector 26 through the flow path 14 and the connecting flow path 30 of the body 16.

Moreover, a temperature, which changes accompanying a change in pressure that occurs when hydrogen gas is filled into the tank 12 or when hydrogen gas is discharged from the tank 12, as has been described above, is detected by the sensor (not shown) of the detector 20, and by outputting the temperature as an electrical signal through the lead wires 36 and the coupler 34 to a non-illustrated control device, the temperature of the hydrogen gas is measured.

Further, the high pressure gas, which is used for filling the tank 12 through the in-tank valve 10, or which is discharged from the tank 12, is not limited to hydrogen gas.

In the foregoing manner, according to the present embodiment, the retaining unit 22 is included, which retains the detector 20 with respect to the drive unit 18 that constitutes the in-tank valve 10, and the retaining unit 22 is made up from the base member 62, which is fixed with respect to the housing 32 of the drive unit 18, and the bracket 60 including the pair of arm members 64a, 64b formed on both ends of the base member 62. The bracket 60 includes elasticity due to the thin plates that are made up from a metal material, and by the pair of arm members 64a, 64b being inserted in and engaged with the engagement holes 54 in the detector 20, due to the elasticity thereof, a pulling force is applied with respect to the detector 20 to pull the detector 20 toward the side of the drive unit 18 (in the direction of the arrow A) and retain the detector 20 thereon.

As a result, the detector 20 is retained firmly in a state of always being pulled toward the side of the drive unit 18 (in the direction of the arrow A) by the elastic force of the bracket 60, while in addition, without using screws or the like, and with a simple structure, since the detector 20 can be retained with respect to the connector 38 of the drive unit 18, ease of assembly can be enhanced.

Further, since a compact structure can be provided in which the bracket 60 does not project outwardly from the outer circumferential sides of the drive unit 18 and the detector 20, no obstacle is encountered when the in-tank valve 10 including the drive unit 18, etc., is inserted through the opening 12a into the interior of the tank 12, and ease of assembly is favorable.

Furthermore, since the bracket 60 is a separate body apart from the drive unit 18 and the detector 20, by appropriately selecting the material and shape, etc., of the bracket 60, the pulling force by which the detector 20 is pulled toward the side of the drive unit 18 (in the direction of the arrow A) can be set freely. Stated otherwise, an appropriate retaining unit 22 can be constituted by suitably selecting the shape and material of the bracket 60 responsive to the shape and weight of the detector 20.

Further still, since a structure is provided in which the engagement holes 54 are formed in the attachment part 50 of the detector 20, and the arm members 64a, 64b of the bracket 60 are inserted in and engaged with the engagement holes 54, the detector 20 can be fixed easily and reliably with respect to the drive unit 18, simply by insertion of the arm members 64a, 64b into the engagement holes 54.

As a result, compared to a case of connecting the drive unit 18 and the detector 20 using screws or the like, by using the retaining unit 22 that is made up from the bracket 60, the structure can be simplified together with improving ease of assembly.

In the above-described embodiment, although a case has been described in which the bracket 60 is fixed to the connector 38 of the drive unit 18, the invention is not limited to this feature. For example, a structure may be provided in which the bracket 60 is fixed to one end of the detector 20 that faces toward the drive unit 18, and the arm members 64a, 64b thereof are capable of being retained by engaging with respect to the connector 38 of the drive unit 18.

Figure 3A:
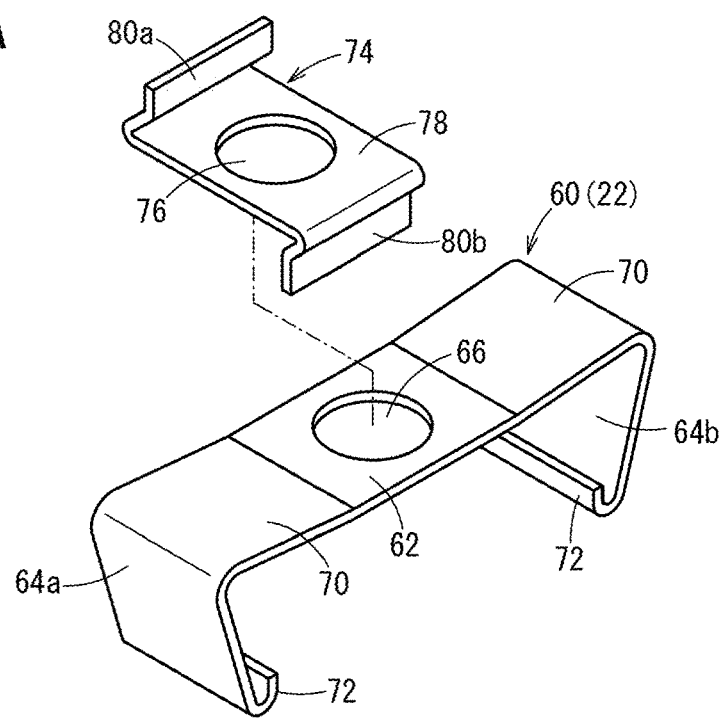
FIG. 3A is an exterior perspective view of a bracket and a rotation preventing member.
Figure 3B:
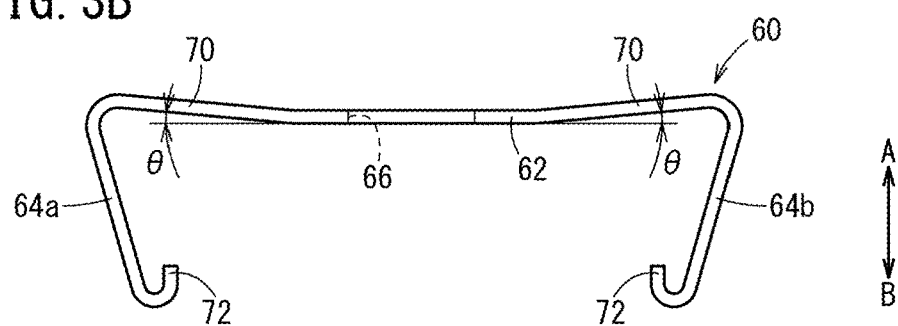
FIG. 3B is a front view of the bracket shown in FIG. 3A.
Figure 3C:
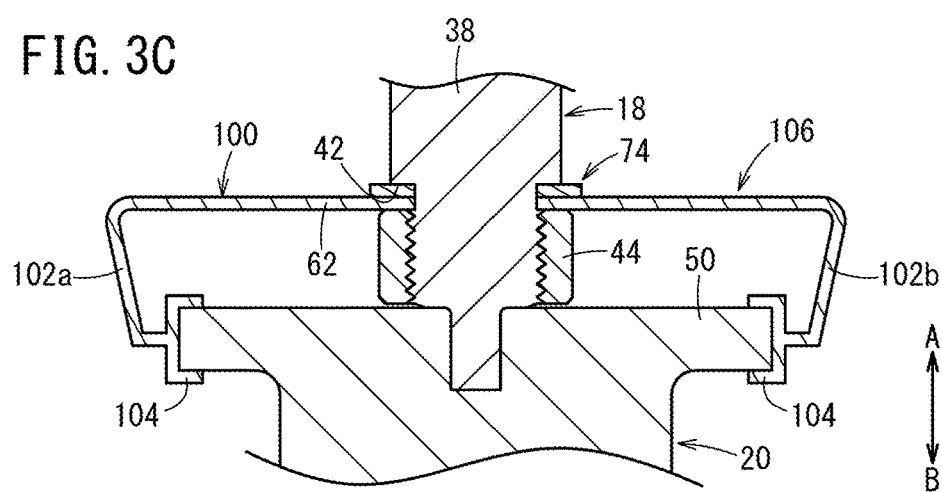
FIG. 3C is an enlarged cross-sectional view showing the vicinity of a connection site between the drive unit and the detector, in which a bracket according to a modification is used.

Further, in place of the aforementioned bracket 60, as in a bracket 100 shown in FIG. 3C, a structure may be provided in which gripping members 104, which are U-shaped in cross section, are included respectively on distal ends of the pair of arm members 102a, 102b, and by the gripping members 104 being placed in engagement from the side with both ends of the attachment part 50 on the detector 20, the detector 20 is capable of being retained by the arm members 102a, 102b of the bracket 100. The gripping members 104 open such that one and the other of the gripping members 104 face toward one another mutually.

By constituting a retaining unit 106 from such a bracket 100, since there is no need for the engagement holes 54 to be formed in the detector 20 for the purpose of engagement with the arm members 64a, 64b of the bracket 60, the manufacturing cost and the number of manufacturing steps for the detector 20 can be reduced.

The in-tank valve according to the present invention is not limited to the embodiment described above, and it goes without saying that various alternative or additional structures may be adopted therein without deviating from the essential gist of the present invention.

What is claimed is:

1. An in-tank valve disposed in a tank in which a high pressure gas is stored in interior thereof, comprising a body including a valve configured to open and close a flow path, and a detector configured to detect a temperature of the high pressure gas, wherein a retaining unit configured to retain the detector with respect to the body is disposed between the body and the detector, and the retaining unit imparts a resilient force in directions to cause the body and the detector to approach one another mutually, wherein the retaining unit comprises:

a base member held on one of the body and the detector to extend in a radial direction of the detector, at least a portion of the base member being inclined toward one of the body and the detector;

a pair of arm members configured to extend with respect to the base member toward another one of the body and the detector; and hooks provided at distal ends of the arm members and folded toward the base member, wherein the hooks are inserted into the other of the body and the detector and engage with a surface of the other of the body and the detector opposite to the base member, and the retaining unit is a separate body apart from the body and the detector.

2. An in-tank valve disposed in a tank in which a high pressure gas is stored in interior thereof, comprising a body including a valve configured to open and close a flow path, and a detector configured to detect a temperature of the high pressure gas, wherein a retaining unit configured to retain the detector with respect to the body is disposed between the body and the detector, and the retaining unit imparts a resilient force in directions to cause the body and the detector to approach one another mutually, wherein the retaining unit comprises:

a base member formed on one of the body and the detector to extend in a radial direction of the detector, at least a portion of the base member being inclined toward the one of the body and the detector;

arm members configured to extend with respect to the base member toward a side of another one of the body and the detector; and hooks provided at distal ends of the arm members and folded toward the base member, wherein the hooks are inserted into the other of the body and the detector and engage with a surface of the other of the body and the detector, and the retaining unit is formed integrally with the one of the body and the detector.

* * * * *